United States Patent [19]

Dehne

[11] 3,818,840
[45] June 25, 1974

[54] POWER AND FREE CONVEYOR SYSTEM

[75] Inventor: Clarence A. Dehne, Farmington, Mich.

[73] Assignee: Jervis B. Webb Company, Detroit, Mich.

[22] Filed: Nov. 15, 1972

[21] Appl. No.: 306,547

[52] U.S. Cl.............................. 104/172 S, 104/96
[51] Int. Cl............................................ B65g 17/42
[58] Field of Search............................ 104/96, 172 S

[56] References Cited
UNITED STATES PATENTS
3,229,645   1/1966   Dehne................................. 104/96
3,640,226   2/1972   Klamp................................ 104/172 S Primary Examiner—M. Henson Wood, Jr.
Assistant Examiner—Robert Saifer
Attorney, Agent, or Firm—Farley, Forster & Farley

[57] ABSTRACT

A power and free conveyor system having a plurality of carriers which circulate on a carrier supporting track from a loading station to an unloading station and return, each carrier having a driving dog releasably engageable by one of a plurality of pushers of a propelling member supported on an adjacent track. Along the forwarding portion of the system extending from the loading station to the unloading station, the carriers are employed in pairs, each pair comprising a forward carrier and a rearward carrier to which the load is attached and which operator as a unit in the conveyance of the load. Engagement between a pusher and the driving dog of the rearward carrier of a pair is prevented along this forwarding portion of the system, alternate arrangements being disclosed for this purpose. An operative relationship between the pushers and the driving dog of each rearward carrier of a pair is provided for along the return portion of the system from the unloading to the loading station so that the carriers can be individually propelled and controlled as desired.

10 Claims, 5 Drawing Figures

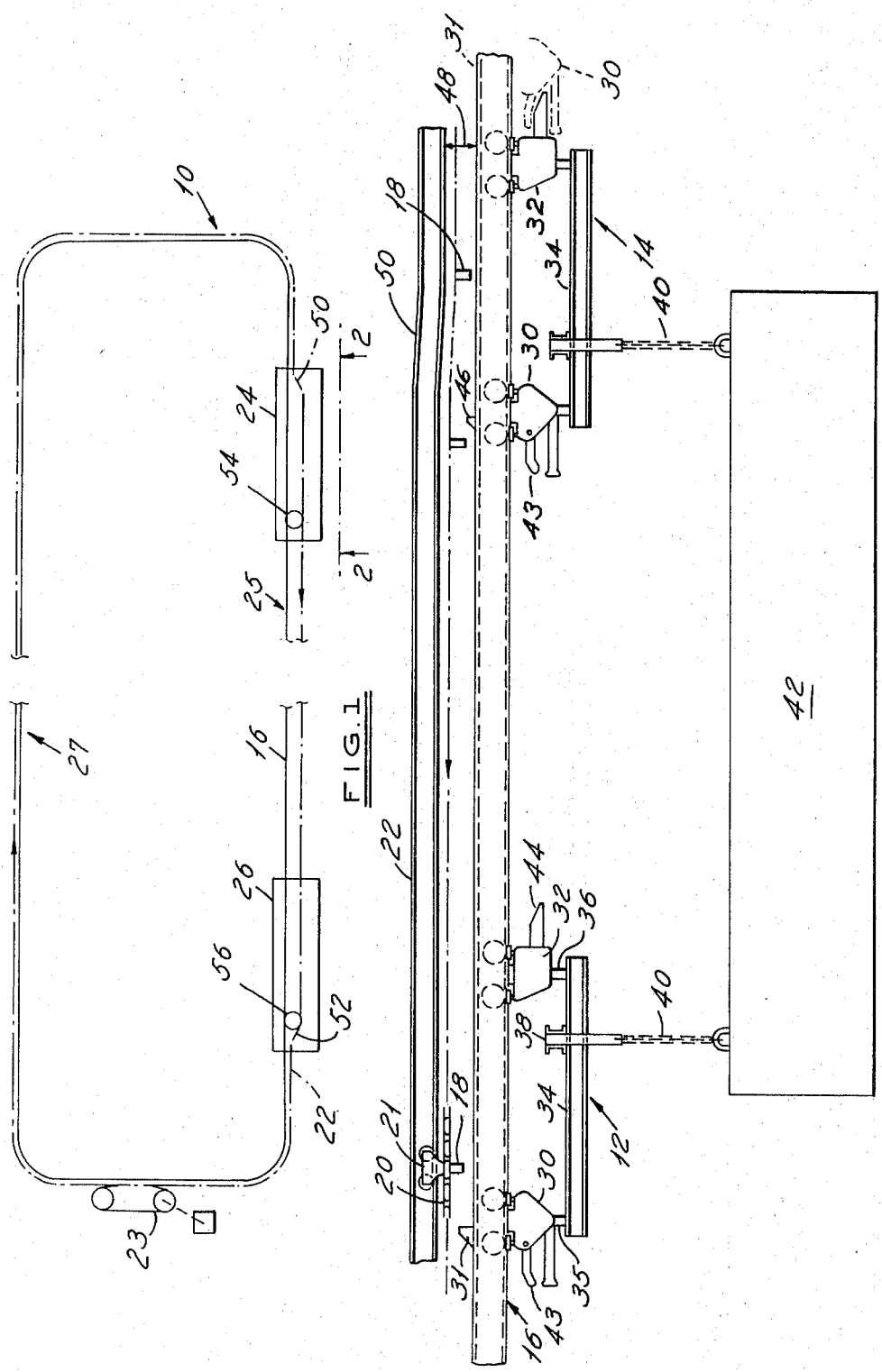

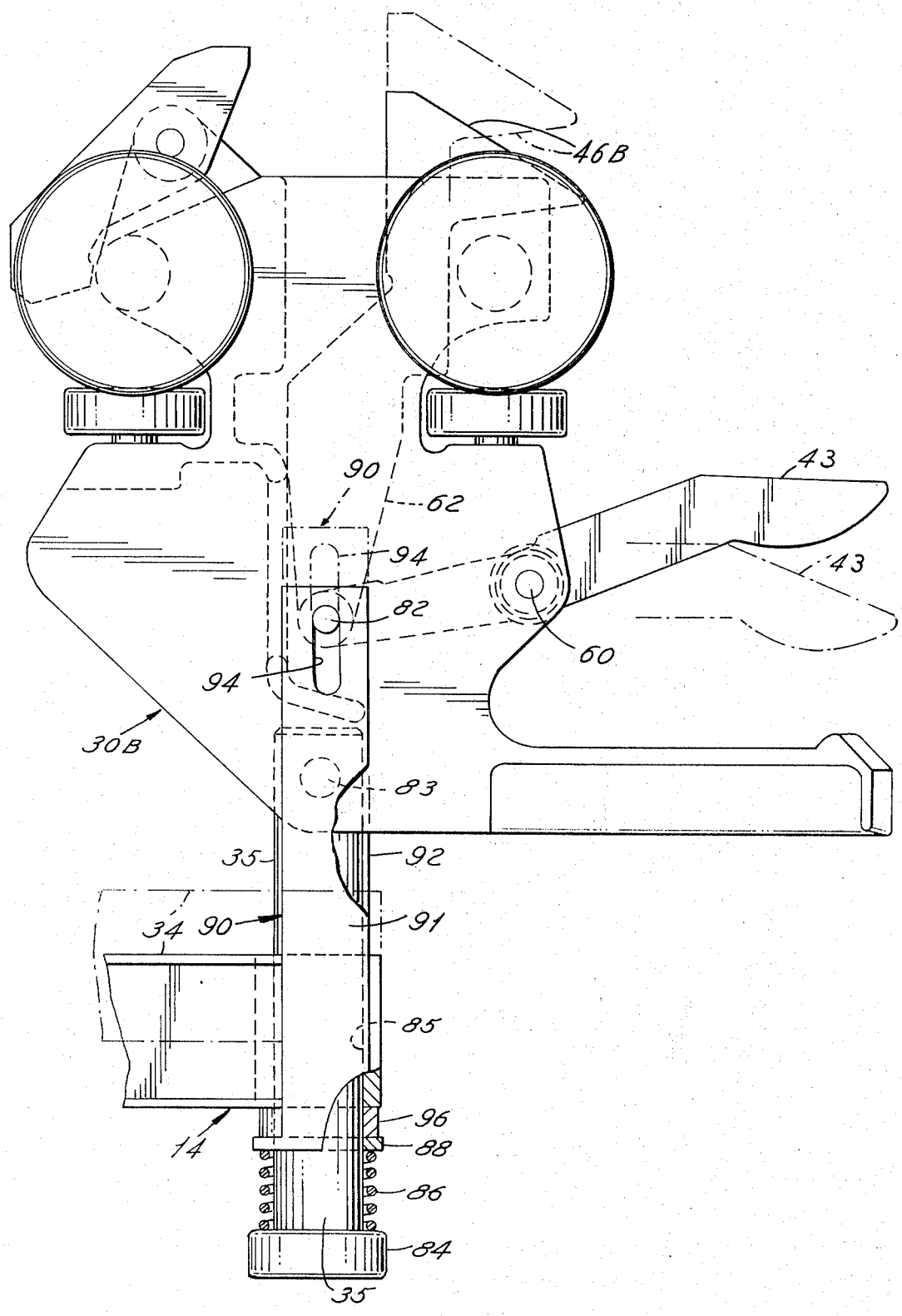

POWER AND FREE CONVEYOR SYSTEM

SUMMARY OF THE INVENTION

This invention relates to improvements in a power and free conveyor system having a plurality of carriers supported on a carrier track, each carrier having a driving dog engageable by one of a plurality of pushers of a propelling member supported on an adjacent track.

In power and free conveyor systems for the handling of relatively long loads, correspondingly long carriers have been provided which are costly, cause chording problems on curves, and require a considerable length of carrier track for any accumulation of empty carriers on the return portion of a system from an unloading back to a loading station. If the load differ in length, this further complicates the carrier construction and increases the cost thereof.

The present invention provides a power and free conveyor system capable of handling long loads which may vary in length, and employing relatively short carriers of simple, standardized construction. Each load is connected to a pair of these carriers at a loading station to form a load carrying unit which is forwarded to an unloading station where the load is detached from the pair of carriers. The empty carriers are then propelled individually on their return to the loading station and can be controlled and accumulated as desired with minimum space requirements.

A conveyor system in accordance with the invention, having a plurality of carriers supported on a carrier track with each carrier having a driving dog engageable by one of a plurality of pushers of a propelling member supported on a track adjacent to the carrier track, comprises a loading station at which a load is attached to a pair of carriers for conveyance thereby, one of the pair of carriers being a forward carrier and the other of the pair of carriers being a rearward carrier; an unloading station at which the load is detached from the pair of carriers; and, means for preventing the driving dog of the rearward carrier from being engaged by any of the pushers during at least a portion of the travel of the pair of carriers from the loading station to the unloading station. At the unloading station, the driving dog of the rearward one of the pair of carriers is returned to engageable relation with the pushers so that the forward and rearward carriers can be individually propelled by pushers when in an unloaded condition.

The means for preventing the driving dog of the rearward carrier from being engaged by any of the pushers may take alternate forms. In one of these forms, a lesser extent of driving engagement is provided between a pusher and the driving dog of the rearward carrier than between a pusher and the driving dog of the forward carrier at a normal spacing between the carrier and propelling member tracks; and, this track spacing is increased beginning at the loading station, the driving dog of the rearward carrier being non-engageable by a pusher at the increased track spacing.

In another of these alternate forms, the rearward carrier of a pair is provided with a latch cam for moving the rearward carrier driving dog to non-driving position relative to the pushers and retaining the driving dog therein, the latch cam being operable either manually or by actuators mounted adjacent to the carrier supporting track.

Still another alternate form consists of an arrangement for moving the rearward carrier driving dog to non-driving position in response to the attachment of the load to the rearward carrier.

The invention will be further described with reference to the embodiments thereof disclosed in the accompanying drawings.

DESCRIPTION OF THE DRAWINGS

FIG. 1 is a schematic plan view of a power and free conveyor system constructed in accordance with the invention;

FIG. 2 is a side elevation, taken as indicated by the line 2—2 of FIG. 1 showing a load connected to a pair of forward and rearward carriers at a loading station;

FIG. 5 is a side elevation showing the driving trolley and the forward portion of a carrier together with an alternate arrangement for moving the driving door of the trolley to non-driving position in response to the carrier being in a loaded condition.

DESCRIPTION OF THE PREFERRED EMBODIMENTS

Figure 3:
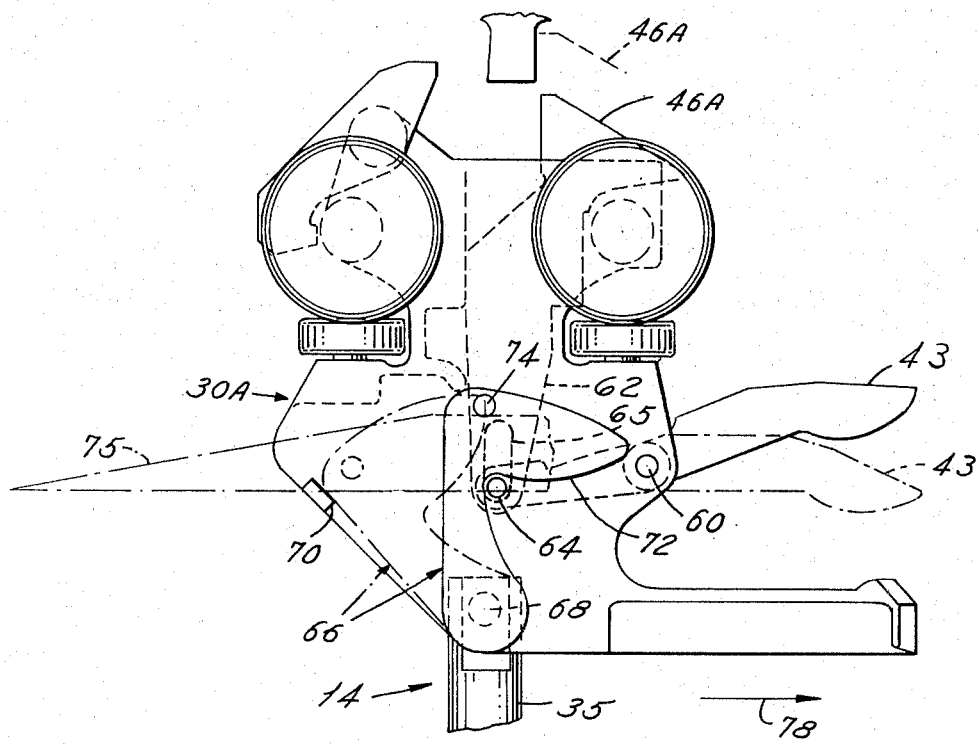
FIG. 3 is a side elevation showing an alternate construction in which the driving trolley of a carrier is equipped with a latch cam for moving and retaining the driving dog of the trolley in non-driving position relative to a pusher.

A conveyor system 10 is schematically represented in FIG. 1 for the purpose of illustrating the invention, with individual components of this system being more completely shown in FIG. 2.

The system 10 includes a plurality of carriers, such as the carriers 12 and 14 shown in FIG. 2, which are supported on a carrier track 16, represented by the solid line in FIG. 1, each carrier having a driving dog engageable by one of a plurality of pushers 18 of a propelling member or chain 20 supported by trolleys 21 on a track 22 adjacent to and above the carrier track 16, the track 22 being represented by the broken line in FIG. 1. A drive unit 23 engages and propels the chain 20 in a conventional manner, causing the pushers to propel the carriers along a forwarding portion 25 of the system between a loading station 24 and an unloading station 26 and along a return portion 27 of the system back to the loading station 24.

FIG. 2 illustrates the loading station 24 at which the load 42 is attached to and connects a pair of the carriers 12 and 14, and for convenience the carrier 12 will be referred to as the forward carrier of the pair and the carrier 14 the rearward carrier of the pair. All other carriers in the system are similar to the carriers 12 and 14 and are capable of being employed as forward and rearward carriers of a pair to which a load 42 is connected at the loading station 24 for conveyance thereby to the unloading station 26, the forward and rearward carriers 12 and 14 and the load 42 forming a load carrying unit which can be controlled as desired along the forwarding portion 25 of the system.

Each of the carriers 12 and 14 is of relatively simple construction. The forward carrier 12 comprises a forward or driving trolley 30 having a driving dog 31, a rearward or trailing trolley 32, a load carrying member 34 pivotally connected to a pair of hangers 35 and 36 secured to the trolleys 30 and 32 and including a transversely extending load supporting member 38 equipped with suitable attachments 40 for connection to one end of a load 42. The driving dog 31 of the forward trolley 30 is preferably releasable from engagement by a pusher 18 by operation of a carrier stop which engages and depresses the driving dog 31, or by operation of a forwardly extending lever 43 on the trolley 30 which is engageable with a rearwardly extending cam 44 on the rearward trolley 32 of a preceding carrier. Further information on the construction of a carrier with a releasable driving dog may be found in U.S. Pat. No. 3,044,416, and on the construction of a device for stopping such a carrier in U.S. Pat. No. 3,229,645.

The construction of the rearward carrier 14 is similar to the carrier 12, and corresponding reference numerals have been employed to identify the parts thereof, except the driving dog on the front trolley of the carrier 14 which is designated by the reference 46 and which normally projects toward the propelling member track 22 a distance less than does the driving dog 31 of the carrier 12, for a purpose to be presently described.

In order to integrate the forward and rearward carriers 12 and 14 and the load 42 into a load carrying unit, means operative beginning at the loading station 24, are provided for preventing the driving dog 46 of the rearward carrier 14 from being engaged by any of the pushers 18 during at least a portion of the travel of the pair of carriers from the loading station 24 to the unloading station 26, and for returning the driving dog of the rearward carrier to engageable relation with one of the pushers at the unloading station. In some applications of the invention it may be desirable to employ the driving dog 46 of the rearward carrier 14 along a part of this forwarding portion 25 of the system for the purpose of propelling the load carrying unit, for example, in the transfer of the unit from one propelling chain to another as disclosed in U.S. Pat. No. 3,314,377.

Alternate constructions are shown for preventing the driving dog 46 of the rearward carrier 15 from being engaged by a pusher. In the system of FIGS. 1 and 2, the driving dog 46 of the rearward carrier 14 is shorter than the driving dog 31 of the forward carrier 12, thereby providing a lesser extent of driving engagement between a pusher 18 and the driving dog 46 than between a pusher 18 and the driving dog 31 at a normal spacing between the carrier and propelling member tracks, as indicated by the dimension 48 at the right of FIG. 2. Beginning at the loading station 24, a greater than normal spacing is established between the carrier and propelling member tracks 16 and 22 by providing a rise section 50 in the propelling member track, at which greater spacing the driving dog 46 of the rearward carrier 14 is not engageable by a pusher 18. The driving dog 46 of the rearward carrier is returned to engageable relation with one of the pushers 18 at the unloading station 26, where the load 42 is detached from the pair of carriers, by providing a drop section 52 (schematically illustrated in FIG. 1) in the propelling member track 22 which returns the tracks to the normal spacing. The forward and rearward carriers 12 and 14, following the drop section 52, become individually engageable and propellable by the pushers 18 and can be controlled and accumulated as desired along the return portion 27 of the system.

As illustrated in FIG. 1, a carrier stop 54 is provided at the loading station 24 and is located beyond the rise section 50 a distance at least equal to the maximum length of the load 42 to be attached to a pair of carriers. A forward carrier 12 entering the loading station 24 is advanced by a pusher to the stop 54 where the forward carrier driving dog 31 is disengaged from the pusher propelling it and motion of the carrier is arrested. The rearward carrier 14 of the pair is advanced into the loading station, until its driving dog disengages from a pusher 18 along the rise section 50, and may then be maneuvered manually into proper position for attachment of the load to the pair of carriers 12 and 14. When the stop 54 is opened, the driving dog 31 of the forward carrier is engaged by the next oncoming pusher 18 and the pair of carriers 12 and 14 and load 42 connected thereto advance as a unit under propulsion by the driving dog 31 of the forward carrier only.

At the unloading station 26, a stop 56 is preferably employed to halt forwarding movement of this load carrying unit while the load 42 is detached from the pair of carriers. When the stop 56 is opened, the forward carrier 12 will be picked up by the next advancing pusher and the rearward carrier 14 can be manually advanced to the drop section 52 and into position for engagement by a pusher.

Figure 4:
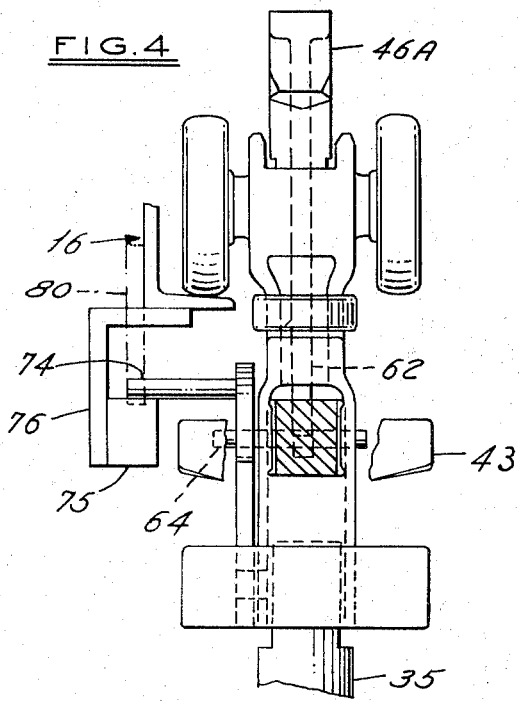
FIG. 4 is a transverse elevation of the trolley shown in FIG. 3.

One alternate form of means for preventing the driving dog of the rearward carrier from being engaged by any of the pushers is shown in FIGS. 3 and 4 which show an alternate form of counstruction for a forward trolley 30A of a rearward carrier 14. This trolley 30A is equipped with a driving dog 46A movable between an engageable position and a non-engageable position (shown respectively in broken and full line in FIG. 3) by operation of the lever 43 which is connected to the trolley 30A by a pivot 60 and to a downwardly extending portion 62 of the dog 46A by a pin 64, the pin 64 projecting laterally through a slot 65 in one side of the body of the trolley 30A. A latch device 66 is pivotally mounted on this one side of the trolley 30A by a pin 68 to which the load hangar 35 is also connected, the latch device 66 being movable between the positions shown in full and broken line in FIG. 3. In the broken line position, the latch device 66 is inoperative and rests against a supporting abutment 70. In the full line position of the latch device 66, a cam surface 72 thereon is engageable with the pin 64, thereby moving the driving dog 46A to the non-engageable position thereof and retaining it therein.

The latch device 66 may be moved manually or automatically. For automatic movement, a laterally projecting follower 74 secured to the latch device is engageable with a cam 75 mounted adjacent to the carrier supporting track 16 on a bracket 76 attached to the track as shown in FIG. 4, the cam and follower causing movement of the latch device to the operative full line position in response to forward movement of the trolley 30A in the direction indicated by the arrow 78 in FIG. 3. Movement of the latch device 66 to inoperative position may be produced automatically by providing an abutment 80 on the carrier track engageable by the follower 74.

Another alternate construction is shown in FIG. 5 wherein the means for preventing the driving dog of the rearward carrier from being engaged by any of the pushers is responsive to the attachment of the load 42 to the rearward carrier 14.

In this construction, a forward trolley 30B of the rearward carrier 14 is equipped with a driving dog 46B also movable relative to the pushers 18 between the engageable position shown in broken line and the non-engageable position shown in full line by operation of the lever 43 pivoted to the trolley body at 60 and connected to the lower portion 62 of the driving dog 46B by a pin 82 which projects outwardly to each side of the trolley 30B. The load hangar 35, connected to the trolley 30B by a pivot pin 83, is provided with an abutment 84 at the lower end thereof, and the load carrying member 34 is movably mounted on the load hangar, the load carrying member including a sleeve 85 slidably and pivotally engaging the load hangar 35. Yieldable means in the form of a spring 86 normally urges the load carrying member to an unloaded position shown in broken line and permits movement of the load carrying member 34 to a loaded position shown in full line in response to the attachment of a load to the rearward carrier 14. This spring 86 is mounted between the abutment 84 and a base portion 88 of a member 90 (which is U-shaped in transverse elevation), the U-shaped member 90 having a pair of legs 91 and 92 which extend upwardly on either side of the trolley 30B and are each provided with a slot 94 engaging the pin 82. A thrust bearing 96 is mounted between the lower face of the sleeve 85 of the load carrying member 34 and the upper surface of the base portion 88 of the U-shaped member 90.

When the load 42 is connected to the rearward carrier 14, constructed as shown in FIG. 5, the load carrying member 34 moves downwardly from the broken to the full line position, and the U-shaped member 90 provides a connection from the load carrying member to the driving dog capable of moving the driving dog to the non-engageable position thereof. When the carrier 14 constructed as shown in FIG. 5 is unloaded, the U-shaped member 90 is moved upwardly with the load carrying member 34 by the spring 86 to the position shown in broken line in which the slot 94 in the U-shpaped member allows free movement of the driving dog 46B between the engageable and non-engageable positions so that the carrier 14 may be independently propelled by a pusher and stopped and accumulated as desired.

I claim:

1. A conveyor system including a plurality of carriers supported on a carrier track, each carrier having a driving dog engageable by one of a plurality of pushers of a propelling member supported on a track adjacent to the carrier track; wherein the improvement comprises:

a loading station at which a load is attached to and connects a pair of carriers to form a load carrying unit, one of the pair of carriers being a forward carrier and the other of the pair of carriers being a rearward carrier;

an unloading station at which the load is detached from the pair of carriers, the carrier track including a forwarding portion extending from the loading station to the unloading station and a return portion extending from the unloading station to the loading station; and, means operative beginning at the loading station for preventing the driving dog of the rearward carrier of the load carrying unit from being engaged by any of the pushers during at least a portion of the travel of the load carrying unit from the loading station to the unloading station and for returning the driving dog of said rearward carrier to engageable relation with one of the pushers at the unloading station whereby the pair of carriers can be individually propelled along the return portion of the carrier track.

2. A conveyor system according to claim 1 wherein the means for preventing the driving dog of the rearward carrier from being engaged by any of the pushers comprises the provision of a lesser extent of driving engagement between a pusher and the driving dog of the rearward carrier than between a pusher and the driving dog of the forward carrier at a normal spacing between the carrier and propelling member tracks, and a greater than normal spacing between said tracks is established beginning at the loading station, at which greater spacing the driving dog of the rearward carrier is not engageable by a pusher, said tracks being returned to the normal spacing at the unloading station.

3. A conveyor system according to claim 1 wherein the driving dog of the rearward carrier is movable to a non-engageable position relative to a pusher, and the means for preventing the driving dog of the rearward carrier from being engaged by any of the pushers comprises a latch device on the rearward carrier for retaining the driving dog thereof in the non-engageable position.

4. A conveyor system according to claim 3 wherein the driving dog of the rearward carrier includes a pin operatively associated therewith, the latch device being movably mounted on the carrier and having a cam surface engageable with the pin, and means for moving the latch device into engagement with the pin whereby the cam surface of the latch device produces movement of the driving dog to the non-engageable position.

5. A conveyor system according to claim 4 wherein the means for moving the latch device includes a follower secured to the latch device and engageable with a cam mounted adjacent to the carrier supporting track.

6. A conveyor system according to claim 1 wherein the means for preventing the driving dog of the rearward carrier from being engaged by any of the pushers is responsive to the attachment of the load to the rearward one of the carriers.

7. A conveyor system according to claim 1 wherein the rearward one of the carriers includes a trolley having a driving dog mounted thereon for movement between engageable and non-engageable positions relative to the pushers, and the means for preventing the driving dog of the rearward carrier from being engaged by any of the pushers comprises a load hangar secured to the trolley, a load carrying member movably mounted on the load hangar, yieldable means normally urging the load carrying member to an unloaded position and permitting movement of the load carrying member to loaded position in response to the attachment of a load to the rearward one of the carriers, and a connection from the load carrying member to the driving dog capable of moving the driving dog to the non-engageable position when the load carrying member moves to said loaded position.

8. A conveyor system according to claim 7 wherein the load hangar is provided with an abutment, the load carrying member including a sleeve slidably engaging the load hangar, and said yieldable means comprises a compression spring interposed between the sleeve and the abutment.

9. A conveyor system according to claim 7 wherein the connection from the load carrying member to the driving dog permits movement of the driving dog to the non-engageable position when the load carrying member is in said unloaded position.

10. A conveyor system according to claim 1 wherein a carrier stop is provided at the loading station for arresting movement of the forward carrier of a pair, the carrier stop being located a distance beyond a location where said means becomes operative for preventing the driving dog of the rearward carrier from being engaged by any of the pushers, said distance being at least equal to the maximum length of the load.

* * * * *